June 30, 1953        J. F. SEBALD         2,643,976
WATER TREATING APPARATUS
Filed April 20, 1950                2 Sheets-Sheet 1

JOSEPH F. SEBALD
INVENTOR.
BY

JOSEPH F. SEBALD
INVENTOR.

Patented June 30, 1953

2,643,976

UNITED STATES PATENT OFFICE 2,643,976

WATER TREATING APPARATUS

Joseph F. Sebald, Bloomfield, N. J., assignor to Worthington Corporation, a corporation of Delaware Application April 20, 1950, Serial No. 156,997

3 Claims. (Cl. 210—16)

This invention relates to water treating apparatus and, more particularly to an improved cold process apparatus for softening, clarifying and purifying water. The present invention embodies the advantages of the known fact that to add raw water and chemicals to a slurry containing previously precipitated particles improves and accelerates the chemical and physical changes involved in separating out the formed substances or solids. The newly formed solids deposit by accretion upon the particles present in the slurry rather than separating out as new small particles. These particles are relatively stable, being not readily subject to disintegration, and of such nature that the clear treated water is readily separated from the slurry.

An object of the present invention is to provide in a water treating apparatus as specified including means for regulating the supply of raw water to the apparatus in accordance with the demand for treated water, means for maintaining a complementary recirculation of treated water through the apparatus so that the flow of recirculated water through the apparatus is complementary to the inlet quantity flow of raw water entering the device so that the flow of water through the apparatus is maintained substantially constant at all times.

Another object of the present invention is to provide means for recirculating through the mixing chamber of the device a predetermined quantity of floc-bearing water in addition to the normal recirculation of floc through the apparatus, which means also serves to vent air which may be separated from the water in the mixing chamber of the apparatus, so as to prevent such separated out air from passing from the mixing chamber into the settling zone or space and to the slurry bed and eliminate the tendency of such air to float slurry above the floc separation zone into the treated water clarification zone.

With these and other objects in view, as may appear from the accompanying specification, the invention consists of various features of construction and combination of parts, which will be first described in connection with the accompanying drawings, showing a water treating apparatus of a preferred form embodying the invention, and the features forming the invention will be specifically pointed out in the claims.

Figure 1:
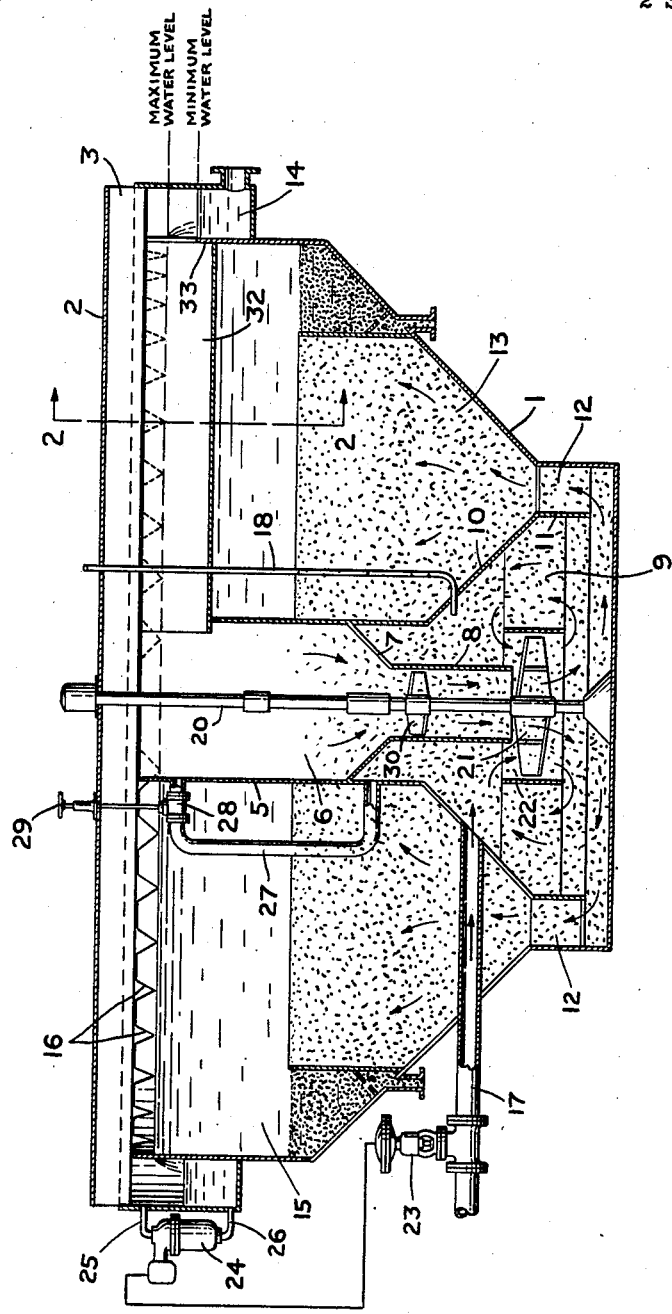
Figure 1 is a vertical section through the improved water treating apparatus.

Referring more particularly to the drawings, the improved water treating apparatus comprises a receptacle 1 which preferably has its upper end open and which may have, spaced from its upper open end a suitable platform or support 2 supported in any suitable manner and providing openings for an annular opening 3 between the top of the receptacle 1 and the support 2.

The receptacle 1 has an annular baffle 5 extending downwardly therein from its uppermost edge and forming a recirculating chamber 6. An inverted frustro-conical partition 7 extends across the space within the annular baffle 5 a short distance upwardly from the bottom of the partition 5. A second annular partition 8 is connected to the lower open end of the inverted substantially frustro-conical baffle 7 and it extends downwardly into the mixing space or chamber 9 having its lower end open so as to provide communication between the recirculation chamber 6 and the mixing chamber or space 9. The mixing chamber or space 9 is formed by a substantially frustro-conical partition 10 attached to or extending downwardly and outwardly from the lower end of the annular partition 5.

The substantially frustro-conical partition 10 has a depending annular portion 11 therein which cooperates with the outer wall of the receptacle 1 to provide an upflow annular channel 12 from the mixing chamber 9 into the settling space 13 which is formed within the receptacle 1.

The receptacle 1 has an annular storage chamber 14 for treated water formed thereabout and in communication with the storage chamber 14 and the collection zone 15, which is formed in the receptacle 1 above the settling zone 13, is through a plurality of V-notch weirs 16 formed in the upper edge of the receptacle 1. Raw untreated water flows into the mixing chamber 9 through the raw water inlet pipe 17 and chemicals or reagents are fed into the mixing chamber through a suitable conduit 18.

A vertical shaft 20 extends axially through the recirculation chamber 6 and the mixing chamber 9 and it has a double bladed pump impeller or propeller 21 mounted thereon which cooperates with the annular partition 22 to cause a mixing recirculation of raw water chemicals and slurry in the mixing chamber 9. The action of the pump impeller or propeller 21 is much the same as the action of the corresponding element described in my prior Patent No. 2,464,617 dated March 15, 1949. In operation, the raw water enters the mixing chamber through the inlet pipe 17 where it is thoroughly mixed with the chemical or reagent and with slurry containing previously precipitated solids or foreign substances and from the mixing chamber 9 the effluent passes through the upflow annular channel 12 into the settling zone 13 where the floc or slurry bed forms and through which the water filters into the collection zone which receives and contains treated water.

The quantity of raw water delivered to the mixing zone 9 through the inlet pipe 17 is controlled by a pressure actuated diaphragm valve structure 23 and this pressure actuated valve structure is in turn controlled by a float level control device 24 which is a standard unit that may be purchased upon the open market and which is shown and described in detail in my prior Patent No. 2,464,617 abovementioned. The float level control device 24 is connected by the pipes 25 and 26 to the storage chamber 14 for treated water so that the flow of raw water into the mixing chamber 9 will be under control of the level of treated water in the storage chamber 14.

For the purpose of accelerating the precipitation of the foreign substances from the water in the mixing zone a pipe or conduit 27 has its inlet end connected to the uppermost part of the mixing chamber 9. The outlet end of the conduit 27 is into the recirculation chamber 6 near the top thereof. A valve 28 which is controlled from the platform of support 2 by a suitable hand drill 29 is located in the conduit 27. During the operation of the device some of the slurry will pass through the conduit 27 and out into the recirculation chamber 6 where it will pass downwardly through the recirculation chamber under action of the pump impeller or propeller 30 which is mounted in the reduced portion of the recirculating chamber formed by the annular partition 8. Air which has been separated out from the mixture in the mixing chamber 9 will also flow upwardly through the conduit 27 and into the upper end of the recirculation chamber 6 and flow out of the open upper end or top of the recirculation chamber to atmosphere, thus providing a vent for the separated out air and preventing it from passing upwardly through the slurry or floc bed and causing slurry to float above the separation or settling out zone 13 into the collection zone 15.

To provide unimpeded operation of the apparatus when a reduced quantity of raw water is being fed into the mixing chamber 9, means are provided for returning part of the treated water to the mixing chamber. In the construction of the present invention shown in Figure 1 of the drawings, such means comprises a launder 32 which has communication with the storage chamber 14 for treated water by means of a weir 33. The launder 32 opens into the upper end of the recirculation chamber 6 as clearly shown in Figure 1 of the drawings. When the water level in the treated water storage space 14 reaches a minimum value no flow of treated water can take place over the weir 33 into the launder. During such an operating condition, the apparatus will be operating at full load and no recirculation of treated water is required. When the apparatus operates at no load or at a greatly decreased load, the level of treated water in the chamber 14 builds up to the maximum level and provides sufficient static head over the weir 33 to proportion treated water flow back to the recirculating chamber 6 in such a manner as to simulate full load operations of the apparatus. The pump impeller or propeller 30 which is located in the lower portion of the recirculation chamber 6 is provided to pump the recirculating water through the mixing chamber 9, upflow passages 12 and into the settling or separation space 13. By proper selection of inlet regulating valve 23, characteristic and design of recirculation control weir 33, the flow through the floc bed in conjunction with the pump provided can be maintained substantially constant under all load conditions.

Figure 3:
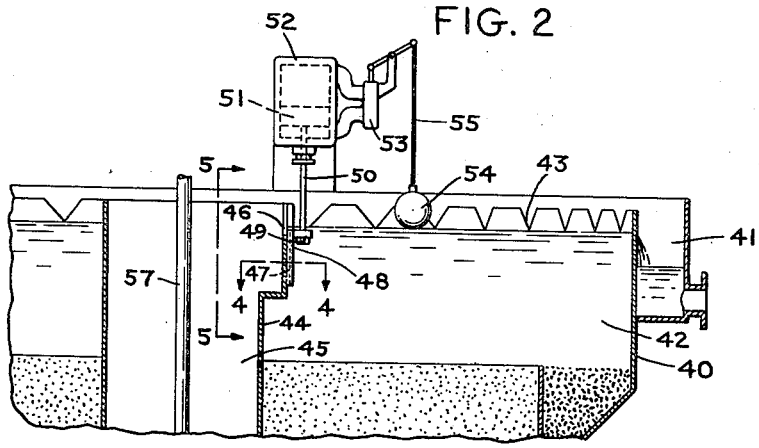
Figure 3 is a fragmentary vertical section through a modified form of the invention.
Figure 5:
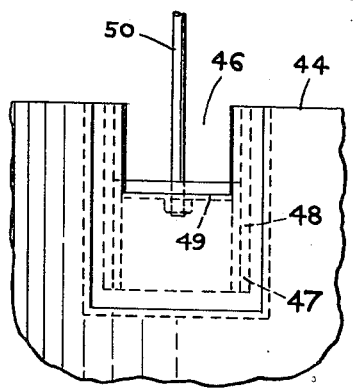
Figure 5 is a detailed vertical section taken on the line 5—5 of Figure 3.
Figure 4:
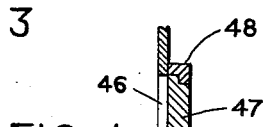
Figure 4 is a detailed horizontal section taken on the line 4—4 of Figure 3.

Figures 3 to 5, inclusive, of the drawings show a modified form of the invention. The apparatus shown in Figure 3 of the drawings is the same as the apparatus shown in Figure 1 of the drawings in all respects excepting only as to the manner of providing and controlling the flow of the recirculating treated water into the recirculation chamber.

In this modified form of the invention the receptacle 40 has a storage chamber 41 for treated water provided therein which has communication with the collection space 42 for treated water by a plurality of notched weirs 43 formed in the upper edge of the receptacle. An annular partition 44 forms the recirculating chamber 45 which is the same as the recirculating chamber 6.

Figure 2:
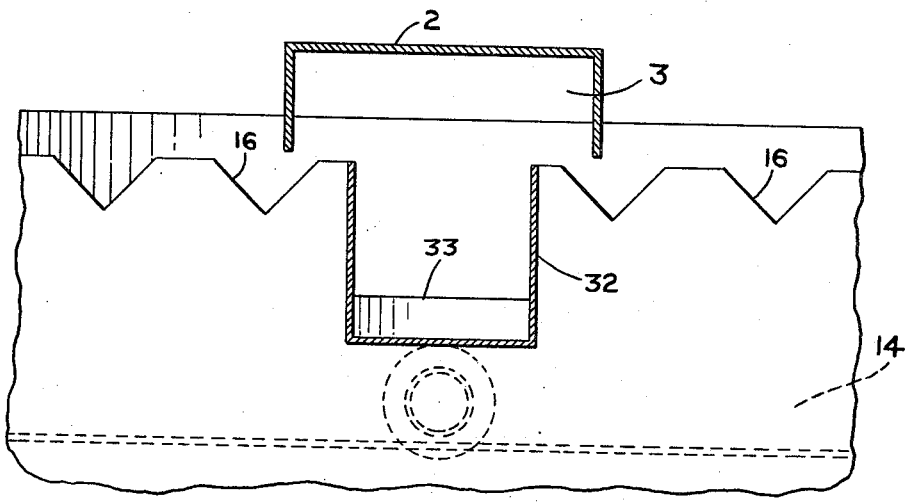
Figure 2 is a detailed vertical section taken on the line 2—2 of Figure 1.

The flow of raw water into the mixing chamber of the modified form of the invention is under control of a pressure actuated valve the same as the valve 23 which is in turn operated by a float level control device the same as the device 24 shown in Figure 1, and the operation of the modified form of apparatus is in all respects the same as that of the structure shown in Figures 1 and 2 of the drawings.

In the modified form of structure shown in Figure 3, the recirculating chamber 45 has communication with the collection space 42 and consequently with the storage chamber 41 through passageway 46 formed in the partition 44 near its top. The area of the passageway 46 open to permit the flow of treated water into the recirculation chamber 45, is controlled by an adjustable weir or sliding gate 47. The sliding weir or gate 47 is supported in suitable guideways 48 carried by the partition and has a connection indicated at 49 to the piston rod 50 of a piston or plunger 51. The piston or plunger 51 is mounted for reciprocatory movement in a cylinder 52 and an operating pressure fluid is admitted to the cylinder 52 on either side of the piston 51 from any suitable source (not shown) through a pilot valve structure 53 of any approved construction which may be purchased upon the open market. The pilot valve structure 53 is operated by movement of a float 54 which is connected to the pilot valve 53 by suitable linkage 55. The float 54 is located in the collection space 42 and is located so that its range of movement will be equal to substantially the depth of the V-notch weirs 43 and thus the V-notch distribution weirs which distribute the flow of treated water from the collection space 42 into the storage chamber 41 is the motivating element of the operation of the float 54 and consequently for the movement of the adjustable weir or gate 47 to control the return flow of treated water through the recirculation chamber 45. As the flow through the apparatus increases, the water level above the apex of the V-notch weirs increases. This change in level which is proportional to flow, is transferred by means of the float operated pilot valve 53 so as to operate the pressure actuated piston 51 which in turn, raises or lowers the adjustable gate or weir to develop a flow complementary to the flow of water through the apparatus.

While in the drawings the passageway 46 is shown as a single opening through the partition 44 it is to be understood that a plurality of submerged orifices or openings may be provided which are controlled by a suitable adjustable element corresponding to the weir or gate 47 under action of the pressure actuated piston.

As in the structure shown in Figure 1 of the drawings, a system of impellers or propellers are mounted on a single shaft shown at 57 in such manner as to generate sufficient head so as to discharge the proportioned treated water in relation to the quantity returned to the recirculation chamber for recirculation.

It will be understood that the invention is not to be limited to the specific construction or arrangement of parts shown, but that they may be widely modified within the invention defined by the claims.

What is claimed is:

1. In a water treating apparatus, a receptacle, the upper portion of said receptacle including a treated water collection zone and the portion beneath said water collection zone including a settling zone wherein foreign material is precipitated from the water, a treated water storage chamber communicating with said settling zone and having an outlet for treated water, partitions within said receptacle forming a mixing chamber, a recirculation chamber and communicating means for the flow of effluent from said mixing chamber to said settling zone, means for admitting raw water to said mixing chamber, means for admitting chemicals to said mixing chamber, said recirculating chamber having its outlet opening into said mixing chamber, a launder connecting said recirculation chamber and said treated water storage chamber for conveying water from the water storage chamber to the recirculating chamber, and a weir at the inlet of the chamber whereby treated water will not flow to said recirculating chamber until the water level in the storage chamber rises above the weir.

2. In a water treating apparatus, a receptacle, the upper portion of said receptacle including a treated water collection zone and the portion beneath said water collection zone including a settling zone wherein foreign material is precipitated from the water, a treated water storage chamber communicating with said settling zone and having an outlet for treated water, partitions within said receptacle forming a mixing chamber, a recirculation chamber and communicating means for the flow of effluent from said mixing chamber to said settling zone, means for admitting raw water to said mixing chamber, means for admitting chemicals to said mixing chamber, said recirculating chamber having its outlet opening into said mixing chamber, a launder connecting said recirculation chamber and said treated water storage chamber for conveying water from the water storage chamber to the recirculating chamber, a weir at the inlet of the chamber whereby treated water will not flow to said recirculating chamber until the water level in the storage chamber rises above the weir, and a conduit having inlet communication with said mixing chamber and outlet communication with the upper part of said recirculation chamber to permit slurry and air to flow from the mixing chamber into the recirculation chamber.

3. In a water treating apparatus, a receptacle, the upper portion of said receptacle including a treated water collection zone and the portion beneath said water collection zone including a settling zone wherein foreign material is precipitated from the water, a treated water storage chamber communicating with said settling zone and having an outlet for treated water, partitions within said receptacle forming a mixing chamber, a recirculation chamber and communicating means for the flow of effluent from said mixing chamber to said settling zone, means for admitting raw water to said mixing chamber, means for admitting chemicals to said mixing chamber, said recirculating chamber having its outlet opening into said mixing chamber, a launder connecting said recirculation chamber and said treated water storage chamber for conveying water from the water storage chamber to the recirculating chamber, a weir at the inlet of the chamber whereby treated water will not flow to said recirculating chamber until the water level in the storage chamber rises above the weir, a pumping impeller in said recirculating chamber for pumping effluent from the recirculating chamber into the mixing chamber, and a conduit having inlet communication with said mixing chamber and outlet communication with the upper part of said recirculation chamber above said impeller to permit slurry and air to flow from the mixing chamber into the recirculation chamber.

JOSEPH F. SEBALD.

References Cited in the file of this patent

UNITED STATES PATENTS

| Number | Name | Date |
|---|---|---|
| 2,245,583 | Green | June 17, 1941 |
| 2,355,561 | Robinson | Aug. 8, 1944 |
| 2,355,564 | Sebald | Aug. 8, 1944 |
| 2,378,799 | Sebald | June 19, 1945 |
| 2,464,617 | Sebald | Mar. 15, 1949 |
| 2,523,523 | Robinson et al. | Sept. 26, 1950 |
| 2,526,478 | Hoffman et al. | Oct. 17, 1950 |